United States Patent [19]

Numata

[11] 4,295,716
[45] Oct. 20, 1981

[54] MODE CHANGE-OVER DEVICE FOR AUTOMATIC EXPOSURE CONTROL CAMERA

[75] Inventor: Saburo Numata, Urawa, Japan

[73] Assignee: Fuji Photo Optical Co., Ltd., Omiya, Japan

[21] Appl. No.: 33,217

[22] Filed: Apr. 25, 1979

[30] Foreign Application Priority Data

Apr. 28, 1978 [JP] Japan ............................... 53-51985

[51] Int. Cl.³ ............................................. G03B 7/14
[52] U.S. Cl. ........................................ 354/30; 354/38
[58] Field of Search ...................... 354/36, 38, 29, 30, 354/229

[56] References Cited

U.S. PATENT DOCUMENTS 4,011,569 3/1977 Mashimo ............................... 354/36
4,167,313 9/1979 Tsunefuji .............................. 354/31

Primary Examiner—Donald A. Griffin
Assistant Examiner—Stafford D. Schreyer

[57] ABSTRACT

In a dual priority automatic exposure control camera in which the exposure control mode can be selected among aperture priority, shutter speed priority, program control and manual control, a mode change-over device is provided for selecting one of the exposure control modes. The mode change-over device includes a first signal generator which gives a first signal indicating whether the shutter speed is automatically controlled or manually selected, a second signal generator which gives a second signal indicating whether the aperture is automatically controlled or manually selected, and a mode discriminator connected with the two signal generators for discriminating the exposure control mode based on the combination of the first and second signals. The output of the mode discriminator is connected with an exposure control system to control the shutter speed and/or the aperture according to the discriminated mode of exposure control.

3 Claims, 2 Drawing Figures

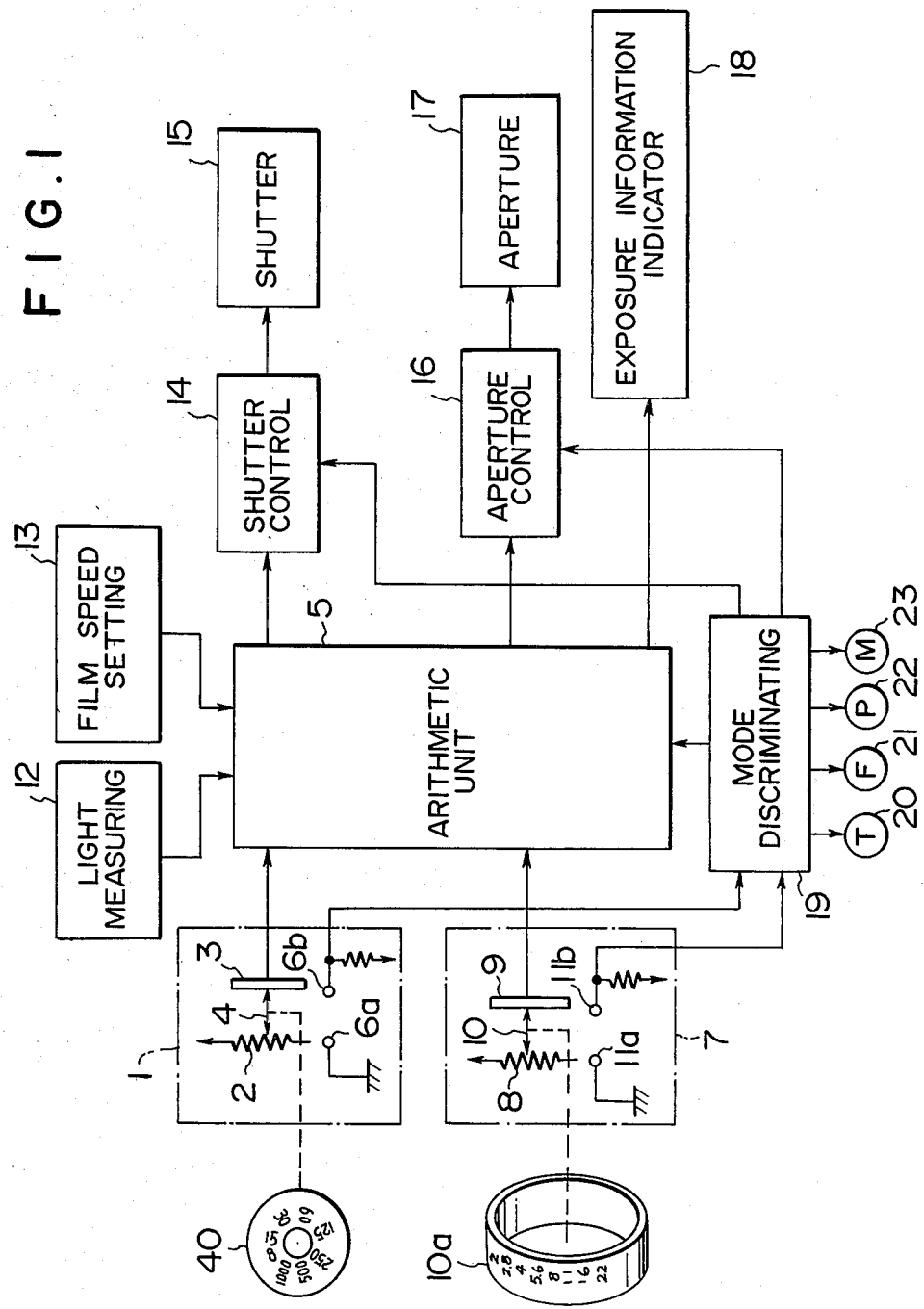

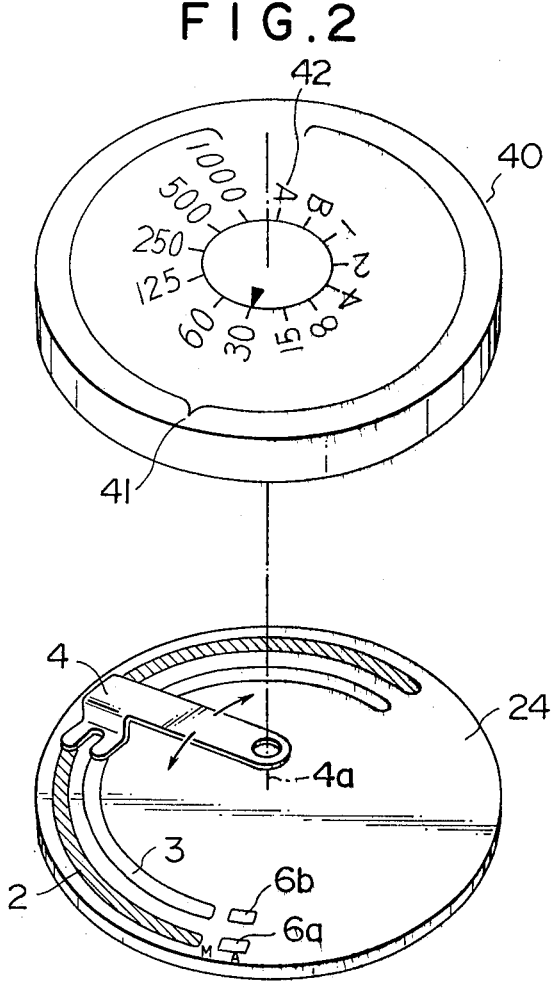

MODE CHANGE-OVER DEVICE FOR AUTOMATIC EXPOSURE CONTROL CAMERA

BACKGROUND OF THE INVENTION

1. Field of the Invention

This invention relates to a mode change-over device for a dual priority automatic exposure control camera, and more particularly to a device for changing over the mode of priority in automatic exposure control between aperture priority, shutter speed priority, program control and manual control in an automatic exposure control camera.

2. Description of the Prior Art

In the automatic exposure control camera, there are aperture priority automatic control and shutter speed priority automatic control. Further, there is also known a program control in which both the aperture and shutter speed are controlled together in predetermined combinations. In view of the defects inherent in any of these known types of exposure control, there has recently been developed and put into practical use a dual priority type automatic exposure control in which one of the aperture priority and shutter speed priority can be selected as desired.

SUMMARY OF THE INVENTION

The object of the present invention is to provide a mode change-over device for a dual priority type automatic exposure control camera capable of changing the mode between aperture priority, shutter speed priority and further program control.

Another object of the present invention is to provide a mode change-over device for a dual priority type automatic exposure control camera which is capable of changing the mode between automatic exposure control in which aperture priority, shutter speed priority and program control can be selected and manual control in which both the aperture and shutter speed can be manually selected.

The mode change-over device in accordance with the present invention is characterized in that a contact is provided at an end of a variable resistor constituting an aperture setting means, another contact is provided at an end of another variable resistor constituting a shutter speed setting means, and the mode of exposure control is selected by a code signal comprising a combination of ON and OFF of these contacts. For instance, when an aperture setting member like a aperture setting ring is rotated from a manual position to an automatic position, the contact for automatic aperture control is turned ON and the mode is selected to be the shutter speed priority control mode. When a shutter speed setting member like a shutter speed setting dual is rotated from a manual position to an automatic position, the contact for automatic shutter speed control is turned ON and the mode is selected to be the aperture priority control mode. When both contacts are turned ON, the mode is selected to be the program control mode, and when both are turned OFF the mode is selected to be the manual control mode.

Hence, the four different modes of exposure control can be simply selected by turning ON or OFF only two contacts by operating two operating members. Since the code signal can be obtained by turning ON or OFF only two contacts, the structure of the change-over device is very simple.

BRIEF DESCRIPTION OF THE DRAWING

FIG. 1 is a block diagram showing an example of an automatic exposure control system for a camera in which the mode change-over device in accordance with this invention is employed, and FIG. 2 is a perspective view of an example of a shutter speed setting dial which can be employed in the mode change-over device of this invention.

DESCRIPTION OF THE PREFERRED EMBODIMENT

Now the present invention will be described in detail with reference to the accompanying drawings, particularly to FIG. 1 thereof. A shutter speed setting portion 1 includes a resistor 2 disposed on a base plate 24 (FIG. 2), a contact 3 extending along the resistor 2, and a brush 4 provided in slidable contact with the resistor 2 and the contact 3. The brush 4 is movable in association with a shutter dial 40 and changes the resistance of the variable resistor 2 according to the selected shutter speed. By the resistance, the shutter speed information is set at the shutter speed setting portion 1 and the selected information is outputed to an arithmetic unit 5.

In the vicinity of the ends of the resistor 2 and the contact 3 are provided a pair of contacts 6a and 6b for automatic shutter speed control. When the shutter dial 40 is rotated from the manual position where the shutter speed can be selected among printed shutter speeds 41 to the automatic position where a mark or sign 42 of automatic control is printed, the brush associated with the dial 40 is brought into contact with the automatic shutter speed control contacts 6a and 6b and turns on the contacts 6a and 6b. This is clearly illustrated in FIG. 2.

Referring to FIG. 2, a resistor 2 is vacuum deposited on a base plate 24 in an arcuate form and a contact 3 is disposed thereon concentrically with the resistor 2 inside thereof in an arcuate form. A brush 4 rotatable about a pivot 4a is in slidable contact with the resistor 2 and the contact 3. The shutter dial 40 is fixed to or connected with the brush 4 so that the brush 4 is rotated by rotating the shutter dial 40. The contacts 6a and 6b are located separated from the resistor 2 and the contact 3 at the same ends thereof. When the brush 4 is brought up to the automatic position indicated at "A" in FIG. 2 by rotating the shutter dial 40 to the automatic position 42, the pair of contacts 6a and 6b are electrically short-circuited by way of the brush 4 and the contact is turned ON, and the mode is selected to be the aperture priority control mode or program control mode.

Beside the shutter speed setting portion 1 is provided an aperture setting portion 7. The aperture setting portion 7 includes, similarly to the shutter speed setting portion 1, a resistor 8 disposed on a base plate like the base plate 24 of the shutter speed setting portion, a contact 9 extending along the resistor 8, and a brush 10 provided in slidable contact with the resistor 8 and the contact 9. The brush 10 is movable in association with an aperture setting ring 10a and changes the resistance of the variable resistor 8 according to the selected aperture size. By the resistance, the aperture information is set at the aperture setting portion 7 and the selected information is outputed to the arithmetic unit 5 together with the shutter speed information from the shutter speed setting portion 1.

In case that the exposure control is of digital type, the shutter speed information from the shutter speed setting portion 1 and the aperture information from the aperture setting portion 7 are sent to the arithmetic unit 5 after being converted from analog values to digital values through A-D converters. The arithmetic unit 5 is provided with other than these two kinds of information scene brightness information from a light measuring circuit 12 and film speed information from a film speed setting circuit 13. Thus, four kinds of exposure factor information are introduced into the arithmetic unit 5. The arithmetic unit 5 operates to calculate the aperture size to effect optimum exposure in case of the shutter speed priority control mode, and calculate the shutter speed to effect optimum exposure in case of the aperture priority control mode. In case of the program mode, both the shutter speed and the aperture size effecting the optimum exposure are calculated based on the four kinds of information inputed into the arithmetic unit 5. The obtained shutter speed information is inputed into a shutter control circuit 14 connected with the unit 5 to control the shutter speed of a shutter 15. The obtained aperture information is inputed into an aperture control circuit 16 connected with the unit 5 to control the aperture size of an aperture 17. Further, these kinds of information calculated by the arithmetic unit 5 are indicated at a digital exposure information indicator 18 provided in a viewfinder.

One contact 6a of the pair of contacts 6a and 6b is earthed and the other contact 6b of the contacts is supplied with a predetermined level of voltage. Therefore, when these contacts 6a and 6b are turned ON or short-circuited, a digital signal of "1" is generated here, and when turned OFF or electrically separated, a digital signal of "0" is generated here. Similarly, one contact 11a of the pair of contacts 11a and 11b is earthed and the other contact 11b is supplied with a predetermined level of voltage, and digital signals of "1" and "0" can be obtained thereby. By combining the digital signals "1" and "0" into four combinations of 00, 01, 10 and 11, four kinds of code signals can be obtained as listed below in Table I.

TABLE I

| | Shutter speed priority | Apert. prior. | Program | Manual |
|---|---|---|---|---|
| Shutter speed control contacts (6a, 6b) | 1 (OFF) | 0 (ON) | 0 (ON) | 1 (OFF) |
| Aperture control contacts (11a, 11b) | 0 (ON) | 1 (OFF) | 0 (ON) | 1 (OFF) |
| Code signal | 10 | 01 | 00 | 11 |

The code signal is sent to a mode discriminating circuit 19 and the selected mode is discriminated here and the shutter control circuit 14 and the aperture control circuit 16 are set to the automatic or manual control mode.

According to the mode of exposure control discriminated by the mode discriminating circuit 19, one of the mode indicators 20 to 23 provided in the viewfinder is turned on to indicate therein the mode of exposure control as T (shutter speed priority)20, F (aperture priority) 21, P (program control) 22, and M (manual) 23.

In operation, the exposure control system as shown in FIG. 1 provided with the mode change-over device of this invention operates as described hereinbelow.

(1) Shutter speed priority automatic exposure control

The shutter speed dial 40 is rotated to select the desired shutter speed. In association with the rotation of the shutter speed dial 40, the brush 4 slides along the resistor 2 and the contact 3. On the other hand, the aperture setting ring 10a is rotated to the automatic control position where the pair of contacts 11a and 11b are short-circuited and turned ON by the brush 10. Thus, the shutter speed automatic control contacts 6a and 6b are turned OFF and the aperture control contacts 11a and 11b are turned ON, and the code signal of "10" is inputed into the mode discriminating circuit 19. By the discriminating circuit 19, the indicator 20 "T" is turned ON to indicate that the exposure control mode is the shutter speed priority control mode, the shutter control circuit 14 is put into a manual control state, and the aperture control circuit 16 is put into an automatic control state.

In photographing the shutter 15 is controlled to expose film with the preselected shutter speed and the aperture 17 is controlled to the value calculated by the arithmetic unit 5.

(2) Aperture priority automatic exposure control

The shutter speed dial 40 is rotated to the automatic position 42 where the brush 4 is in contact with the pair of shutter speed automatic control contacts 6a and 6b to short-circuit them. Then, the aperture setting ring 10a is rotated to select a desired size. Thus, the shutter speed automatic control contacts are turned ON and the aperture control contacts 11a and 11b are turned OFF, and the code signal of "01" is inputed into the mode discriminating circuit 19. By the discriminating circuit 19, the second indicator 21 "F" is turned ON to indicate that the exposure control mode is the aperture priority control mode, the aperture control circuit 16 is put into a manual control state, and the shutter speed control circuit 14 is put into an automatic control state.

In photographing, the aperture 17 is controlled to expose the film with the preselected aperture size and the shutter 15 is automatically controlled to the shutter speed calculated by the arithmetic unit 5.

(3) Program control

Both the shutter speed dial 40 and the aperture setting ring 10a are rotated to the automatic position where the brushes 4 and 10 are in contact with and short-circuit the pairs of automatic control contacts 6a, 6b and 11a, 11b. Thus, both the contacts 6a, 6b and 11a, 11b are turned ON and the code signal of "00" is inputed into the mode discriminating circuit 19. By the discriminating circuit 19, the third indicator 22 "P" is turned ON to indicate that the exposure control mode is the program control mode, and both the shutter control circuit 14 and the aperture control circuit 16 are put into the automatic control state.

In photographing, both the shutter 15 and the aperture 17 are automatically controlled to expose the film with one of the programed combinations of the shutter speed and the aperture size.

(4) Manual control

Both the shutter speed dial 40 and the aperture setting ring 10a are rotated to select a desired combination of the shutter speed and the aperture size. Both the contacts 6a, 6b and 11a, 11b are turned OFF and the code signal of "11" is inputed into the discriminating circuit 19. By the discriminating circuit 19, the fourth indicator 23 "M" is turned ON to indicate that the exposure control mode is the manual control, and both the shutter control circuit 14 and the aperture control circuit 16 are put into the manual control state.

In photographing, both the shutter 15 and the aperture 17 are controlled to expose the film with the manually selected combination of the shutter speed and the aperture size.

When a microcomputer is used as the arithmetic unit 5, the address of the ROM in the microcomputer is appointed by the code signal and the instruction memorized in the ROM is read out and the mode of exposure control is selected according to the read out instruction.

I claim:

1. In a dual priority automatic exposure control camera in which mode is selected among aperture priority, shutter speed priority, program control and manual control comprising a shutter speed setting means, an aperture size setting means, a light measuring means, a film speed setting means, a shutter speed control means, an aperture control means, and an exposure control means having input means connected with said shutter speed setting means, aperture setting means, light measuring means and film speed setting means and output means connected with said shutter speed control means and aperture size control means for controlling the shutter speed and the aperture size in accordance with information inputed thereinto, each of said shutter speed setting means and said aperture size setting means comprising a variable resistor having a brush slidable therealong, a mode change-over device comprising a first signal generating means which gives a first signal indicating whether the shutter speed is automatically controlled or manually selected, a second signal generating means which gives a second signal indicating whether the aperture size is automatically controlled or manually selected, and a mode discriminating means having input means connected with said first and second signal generating means and output means connected with said exposure control means, said first signal generating means comprising a first pair of contacts located at an end of the variable resistor of said shutter speed setting means, at least one of the first pair of contacts being connected with said mode discriminating means, and a second pair of contacts located at an end of the variable resistor of said aperture size setting means, at least one of the second pair of contacts being connected with said mode discriminating means, wherein said brush is selectively put into contact with said variable resistor or said pair of contacts in each of said first and second signal generating means, wherein the mode of aperture priority, shutter speed priority, program control and manual control is represented by the combination of said first and second signal.

2. A mode change-over device as defined in claim 1 wherein one contact of each of said first and second pair of contacts is connected with said mode discriminating means, and the other contact of each of said first and second pair of contacts is earthed.

3. A mode change-over device as defined in claim 1, wherein said first signal is "1" or "0" and said second signal is "1" or "0", whereby the combination of the first and second signal is "00", "01", "10", or "11" to provide four kinds of code signal representing four different modes of exposure control.

* * * * *